US011294652B2

(12) United States Patent
Liu et al.

(10) Patent No.: US 11,294,652 B2
(45) Date of Patent: Apr. 5, 2022

(54) LOW-OVERHEAD DETECTION TECHNIQUES FOR SYNCHRONIZATION PROBLEMS IN PARALLEL AND CONCURRENT SOFTWARE

(71) Applicant: The Board of Regents of The University of Texas System, Austin, TX (US)

(72) Inventors: Tongping Liu, San Antonio, TX (US); Mohammad Mejbah ul Alam, San Antonio, TX (US); Abdullah Al Muzahid, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 16/385,118

(22) Filed: Apr. 16, 2019

(65) Prior Publication Data

US 2019/0317746 A1     Oct. 17, 2019

Related U.S. Application Data

(60) Provisional application No. 62/658,784, filed on Apr. 17, 2018.

(51) Int. Cl.
| | | |
|---|---|---|
| *G06F 9/455* | (2018.01) | |
| *G06F 8/41* | (2018.01) | |
| *G06F 9/48* | (2006.01) | |
| *G06F 9/52* | (2006.01) | |

(52) U.S. Cl.
CPC .......... *G06F 8/458* (2013.01); *G06F 9/4856* (2013.01); *G06F 9/524* (2013.01); *G06F 9/528* (2013.01)

(58) Field of Classification Search
CPC ........ G06F 8/458; G06F 9/4856; G06F 9/524; G06F 9/528
See application file for complete search history.

(56) References Cited

U.S. PATENT DOCUMENTS

| | | | | |
|---|---|---|---|---|
| 9,128,779 | B1 * | 9/2015 | Gladkikh | H04L 41/0896 |
| 2004/0250240 | A1 * | 12/2004 | Stoodley | G06F 9/45516 717/116 |
| 2007/0067777 | A1 * | 3/2007 | Branda | G06F 9/52 718/107 |
| 2012/0096449 | A1 * | 4/2012 | Yang | G06F 8/65 717/168 |

* cited by examiner

*Primary Examiner* — Gregory A Kessler
(74) *Attorney, Agent, or Firm* — Smith, Gambrell & Russell LLP

(57) ABSTRACT

The techniques described herein may provide techniques to detect, categorize, and diagnose synchronization issues that provide improved performance and issue resolution. For example, in an embodiment, a method may comprise detecting occurrence of synchronization performance problems in software code, when at least some detected synchronization performance problems occur when a contention rate for software locks is low, determining a cause of the synchronization performance problems, and modifying the software code to remedy the cause of the synchronization performance problems so as to improve synchronization performance of the software code.

20 Claims, 15 Drawing Sheets

Fig. 2

| Category | Symptoms | Quadrant | Root Cause | Solution |
|---|---|---|---|---|
| Improper Primitives | extensive lock acqs, low contention | Q4 | small CS with a simple integer operation | atomic instructions |
| | | | small CS | spin locks |
| | extensive lock acqs, moderate contention | Q2 & Q4 | read/write only CS | reader/writer locks |
| | extensive try-lock failures | N/A | N/A | mutex + cond. var. |
| Improper Granularity | moderate to high contention | Q1 & Q2 | too many data items under the same lock | finer locks |
| | | | too large CS | shrinking CS |
| | extensive lock acqs, low contention | Q4 | multiple small CS in the same function | coarser locks |
| Over-Synchronization | extensive lock acqs | Q2 & Q4 | already mutually exclusive | removing unnecessary locks |
| | | | accessing local data only | removing unnecessary locks |
| | extensive lock acqs high contention | Q2 | different locks are serialized by the same lock | removing the common lock |
| Asymmetric Contention | high contention locks | Q2 | asymmetric contention rate | distribute contention |
| Load Imbalance | disproportionate thread computation and waiting time | N/A | N/A | task redistribution |

Fig. 5

```
Number of distinct locks : 1

Locks with high contention, high frequency

Total found: 0

Locks with high contention, low frequency

Total found: 1
Total waiting time(ms): 490
No.1 lock:
    Contention rate: 86.7%
    Acquisition frequency: 0.3
    Call site:
      ./rng.h:48

Locks with low contention, high frequency

Total found: 0

Locks with asymmetric contention

Total found: 0
```

Fig. 6

```
Total information on 15 CSs of lock #1:
  # of instructions: 47109
  # of instructions accessing memory: 46979
  # of instructions accessing shared memory: 28
```

Fig. 7

```
pthread_mutex_lock(&seed_lock);
_rng = new MTRand(seed++);
pthread_mutex_unlock(&seed_lock);
```

Fig. 8

| Category | Bug Id | Acq. Frequency | Contention Rate | Speed Up (%) | New Bug |
|---|---|---|---|---|---|
| Improper Primitives | facesim | 15288 | 4.6 | 30.7 | ✓ |
| | fluidanimate-I | 44185K | 0 | 11.9 | ✓ |
| | fluidanimate-II | 16304 | 76.6 | 2.5 | |
| | streamcluster | 1199 | 69 | 3 | |
| | x264 | 15857 | 0 | 8.5 | ✓ |
| | Apache | 49607 | 0 | 7.8 | ✓ |
| | memcached-I | 117000 | 0 | 3.7 | ✓ |
| Improper Granularity | canneal | 0.3 | 86.7 | 4.0 | ✓ |
| | memcached-II | 71405 | 45.8 | 16.3 | |
| | MySQL-I | 723K | 25.5 | 18.9 | ✓ |
| | MySQL-II | 146299 | 38.5 | 10.9 | |
| Over-Synchronization | memcached-III | 65445 | 0 | 3.0 | |
| Asymmetric Contention | dedup-I | 23531 | 13.6 | 12.1 | |
| Load Imbalance | dedup-II | N/A | N/A | 28 | |
| | ferret | N/A | N/A | 42 | |

Fig. 9

```
-static void waitForTasks( void ) {
+static void waitForTasks(unsigned long seqnum) {
     TRACE;
 #ifdef ENABLE_PTHREADS
-    pthread_mutex_lock(&sync.lock);
-    sync.threadCount++;
-    if ( sync.threadCount == numThreads)
-        thread_cond_broadcast(&sync.tasksDone );
-        pthread_cond_wait(&sync.taskAvail,&sync.lock);   pthread_mutex_unlock(&sync.lock);
+    if(__atomic_add_fetch(&sync.threadCount, 1, __ATOMIC_RELAXED) == numThreads) {
+        __atomic_store_n(&sync.areTasksDone, 1, __ATOMIC_RELAXED);
+    }
+    // Progress only when the sequence number is sufficient
+    while(__atomic_load_n(&sync.seqnum, __ATOMIC_RELAXED) != seqnum) { ; }
```

Fig. 10

```
-   mutex = new pthread_mutex_t *[numCells];
+   int cache_item_count = CACHE_SIZE
      /sizeof(pthread_spinlock_t);
+   locks = new pthread_spinlock_t *[numCells];
    .......
    .......
    if(border[index]){
          pthread_mutex_lock(&mutex[index][j]);
+         pthread_spin_lock(&locks[index][j]);
          cell.density[j] += tc;
-         pthread_mutex_unlock(&mutex[index][j]);
+         pthread_spin_unlock(&locks[index][j]);
```

Fig. 11

```
        pthread_mutex_lock(&seed_lock);
-       _rng = new MTRand(seed++);
+       int x = seed++;
        pthread_mutex_unlock(&seed_lock);
+       _rng = new MTRand(x);
```

Fig. 14

| Application | LOC (#) | Runtime (Second) | Distinct Locks (#) | Total Acqs (#) | Contentions (#) | Cond waits (#) | Original Memory (MB) | Specified Memory (MB) |
|---|---|---|---|---|---|---|---|---|
| blackscholes | 374 | 43 | 0 | 0 | 0 | 0 | 610 | 619 (1.4%) |
| bodytrack | 7773 | 26 | 7 | 1858971 | 7435 | 34238 | 30 | 74 (147%) |
| canneal | 2812 | 51 | 1 | 15 | 12 | 0 | 941 | 981 (4%) |
| dedup | 23565 | 16 | 2199 | 999467 | 60217 | 7 | 1616 | 1873 (16%) |
| facesim | 34187 | 68 | 17 | 5035705 | 49604 | 1070249 | 326 | 364 (12%) |
| ferret | 25738 | 5 | 5 | 2594 | 4 | 1146 | 68 | 111 (63%) |
| fluidanimate | 2800 | 40 | 9239 | 1723580805 | 255053 | 35251 | 408 | 1064 (161%) |
| raytrace | 13751 | 107 | 18 | 9431 | 480 | 3215 | 1077 | 1127 (4%) |
| streamcluster | 3239 | 58 | 7 | 8088948 | 5552955 | 21251 | 108 | 278 (158%) |
| swaptions | 1099 | 30 | 0 | 0 | 0 | 0 | 7 | 15 (115%) |
| vips | 105280 | 18 | 3 | 2921 | 483 | 1 | 44 | 45 (2%) |
| x264 | 33024 | 29 | 35 | 202776 | 7 | 8236 | 481 | 1518 (215%) |
| Apache | 253340 | 6 | 9707 | 56274 | 36 | 9685 | 50 | 71 (42%) |
| Memcached | 10923 | 8 | 21 | 490000 | 78719 | 1 | 67 | 150 (125%) |
| MySQL | 1606853 | 5 | 157 | 101380 | 3164 | 0 | 961 | 971 (1%) | ature
LOW-OVERHEAD DETECTION TECHNIQUES FOR SYNCHRONIZATION PROBLEMS IN PARALLEL AND CONCURRENT SOFTWARE

CROSS-REFERENCE TO RELATED APPLICATIONS

This application claims the benefit of U.S. Provisional Application No. 62/658,784, filed Apr. 17, 2018, the contents of which are incorporated herein in their entity.

STATEMENT REGARDING FEDERALLY SPONSORED RESEARCH

This invention was made with government support under Grant Numbers 1566154 and 1319983, awarded by the National Science Foundation. The government has certain rights in the invention.

BACKGROUND OF THE INVENTION

The present invention relates to the technical field of detecting synchronization performance problems in parallel software.

Inefficient synchronizations are one of the major sources of performance issues in parallel software. Designing efficient multithreaded programs while maintaining their correctness is not an easy task. Performance issues of multithreaded programs are a significant cause of synchronization fixes of server programs. There are many conventional attempted solutions to this problem, but none of them systematically resolves performance issues related to different types of synchronization primitives. Most existing techniques cannot identify root causes and provide helpful fixing strategies.

For example, many existing techniques focus on locks that are both acquired frequently and highly contended. However, performance problems may also occur with locks that are excessively acquired but not highly contended or highly contended but not frequently acquired. Existing techniques do not adequately resolve the issues with such locks.

Accordingly, a need arises for techniques to detect, categorize, and diagnose synchronization issues that provide improved performance and issue resolution.

SUMMARY OF THE INVENTION

The invention described herein provides techniques to detect, categorize, and diagnose synchronization issues that provide improved performance and issue resolution.

The present techniques may start by monitoring the execution of an application and collecting information about explicit synchronization primitives. More specifically, the present techniques may collect (i) for a lock, how many times the lock is acquired, how many times the lock is found to be contended, and how long a thread waits for the lock, (ii) for a try-lock, how many times the try-lock is called and how many times the try-lock fails because of contention, and (iii) for load imbalance, how long different threads execute, and how long they are waiting for synchronizations. The present techniques may collect callsites for each synchronization operation and thread creation function to help pinpoint the actual problems.

After this, the present techniques may integrate and check the collected information to identify root causes by: (i) checking behavior of all locks with the same callsites to identify asymmetric contention issue, (ii) computing and comparing waiting time of different threads to identify load imbalance issues, and (iii) checking individual as well as collective (based on callsites) information of locks, such as the number of acquisitions and number of times the locks are contended, to identify other performance issues. This integration may help uncover more performance issues. The present techniques may find more performance issues than conventional techniques. For some of the problems, such as asymmetric contention, and load imbalance, the present techniques may automatically report root causes and present an optimal task assignment to solve load imbalance problems. For other problems, the present techniques may provide sufficient information, as well as informal guidelines, to diagnose those problems manually. The present techniques may also provide an additional optional tool (that programmers can use offline) to help the diagnosis process.

For example, in an embodiment, a method may be implemented in a computer system comprising a processor, memory accessible by the processor, and program instructions stored in the memory and executable by the processor to perform a method comprising detecting occurrence of synchronization performance problems in software code, when at least some detected synchronization performance problems occur when a contention rate for software locks is low, determining a cause of the synchronization performance problems, and modifying the software code to remedy the cause of the synchronization performance problems so as to improve synchronization performance of the software code.

In embodiments, the cause of the synchronization performance problems may comprise at least one of: improper primitives, improper granularity, over-synchronization, asymmetric contention, and load imbalance. When the cause of the synchronization performance problems comprises improper primitives, modifications to the software code may include modifying atomic instructions and spin locks, when the cause of the synchronization performance problems comprises improper granularity, modifications to the software code may include modifying fineness of locks and reducing a critical section, when the cause of the synchronization performance problems comprises over-synchronization, modifications to the software code may include removing an unnecessary lock and removing a common lock, when the cause of the synchronization performance problems comprises asymmetric contention, modifications to the software code may include distributing contentions, when the cause of the synchronization performance problems comprises load imbalance, modifications to the software code include redistributing tasks among threads.

The method may further comprise when at least some detected synchronization performance problems occur when a contention rate for software locks is high and a frequency of lock acquisitions is low, determining a cause of the synchronization performance problems and modifying the software code to remedy the cause of the synchronization performance problems so as to improve synchronization performance of the software code. Detecting occurrence of synchronization performance problems in software code may comprise using a first-phase detection tool. The method may further comprise when at least some detected synchronization performance problems occur when a contention rate for software locks is high and a frequency of lock acquisitions is low, a contention rate for software locks is high and a frequency of lock acquisitions is high, or a contention rate for software locks is low and a frequency of lock acquisitions is high, determining a cause of the synchronization performance problems comprises using a second-phase diagnosis tool.

The method may further comprise monitoring execution of the software code and collecting information about explicit synchronization primitives. The collecting information may comprise for a lock, how many times the lock is acquired, how many times the lock is found to be contended, and how long a thread waits for the lock, for a try-lock, how many times the try-lock is called and how many times the try-lock fails because of contention, and for load imbalance, how long different threads execute and how long they are waiting for synchronizations. The method may further comprise collecting callsites for each synchronization operation. The detection may comprise at least one of checking behavior of all locks with similar callsites to identify asymmetric contention, computing and comparing waiting time of different threads to identify load imbalance and checking individual as well as collective information of locks, using callsites, to identify other synchronization performance problems.

In an embodiment, a system may comprise a processor, memory accessible by the processor, and program instructions stored in the memory and executable by the processor to perform a method comprising detecting occurrence of synchronization performance problems in software code, when at least some detected synchronization performance problems occur when a contention rate for software locks is low, determining a cause of the synchronization performance problems, and modifying the software code to remedy the cause of the synchronization performance problems so as to improve synchronization performance of the software code.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and the invention may admit to other equally effective embodiments.

FIG. 2 illustrates categorization of synchronization performance issues.

FIG. 5 illustrates an exemplary from a detection tool according to the present techniques.

FIG. 6 illustrates an exemplary from a diagnosis tool according to embodiments of the present techniques.

FIG. 7 illustrates an example of code that may be modified to reduce synchronization performance issues.

FIG. 8 illustrates an example of effectiveness results of detection of synchronization performance issues.

FIG. 9 illustrates an example of a code modification to reduce synchronization performance issues.

FIG. 10 illustrates an example of a code modification to reduce synchronization performance issues.

FIG. 11 illustrates an example of a code modification to reduce synchronization performance issues.

FIG. 14 illustrates examples of characteristics of evaluated applications.

Other features of the present embodiments will be apparent from the Detailed Description that follows.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention. Electrical, mechanical, logical, and structural changes may be made to the embodiments without departing from the spirit and scope of the present teachings. The following detailed description is therefore not to be taken in a limiting sense, and the scope of the present disclosure is defined by the appended claims and their equivalents.

The techniques described herein may provide techniques to detect, categorize, and diagnose synchronization issues that provide improved performance and issue resolution.

Figure 1:
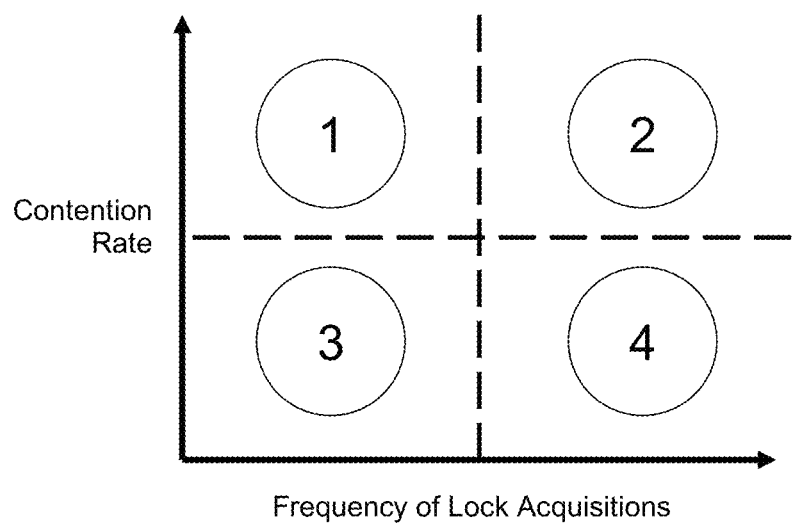
FIG. 1 illustrates an example of quadrants of contention rate versus frequency of lock acquisitions.

The present techniques may use the observation that performance problems may occur even when locks are not frequently acquired or highly contended. These situations are graphically represented in FIG. 1. As shown in FIG. 1, cases in which the contention rate is relatively higher and the frequency of lock acquisitions is relatively lower are designated quadrant 1 (Q1). Cases in which the contention rate is relatively higher and the frequency of lock acquisitions is relatively higher are designated quadrant 2 (Q2). Cases in which the contention rate is relatively lower and the frequency of lock acquisitions is relatively lower are designated quadrant 3 (Q3). Cases in which the contention rate is relatively lower and the frequency of lock acquisitions is relatively higher are designated quadrant 4 (Q4).

Conventional solutions typically focus on quadrant 2 or Q2. Locks of Q2 can definitely cause performance issues but they are not the only culprits. The present techniques may find potential problems with the other two quadrants: (i) locks that are not acquired many times may slow down a program if the critical sections are large and potentially introduce high contention and/or a long waiting time (Q1); (ii) locks that are acquired excessively may cause significant performance problems, even if they are barely contended (Q4). Intuitively, locks of Q3 (lowly contended and not acquired many times) will not cause performance problems. It is not always sufficient to identify root causes of a problem based on the behavior of a single synchronization. For example, for asymmetric contention where different locks are protecting similar data with different contention rates, we have to analyze the behavior of all those locks that typically have the same initialization and acquisition sites. By checking all of those locks together, we can notice that some locks may have higher contention and acquisition than others.

Based on these two factors, the present techniques may not only report the callsites of performance issues, but may also help to diagnose root causes and suggest possible fixes for a range of performance issues related to synchronization primitives. The present techniques may monitor the execution of an application and may collect information about explicit synchronization primitives. More specifically, the present techniques may collect (i) for a lock, how many times it is acquired, how many times it is found to be contended, and how long a thread waits for the lock, (ii) for a try-lock, how many times it is called and how many times it fails because of contention, and finally (iii) for load imbalance, how long different threads execute, and how long they are waiting for synchronizations. The present techniques may also collect callsites for each synchronization operation and thread creation function to help pinpoint the actual problems.

After this, the collected information may be integrated and checked to identify root causes by (i) checking behavior of all locks with the same callsites to identify asymmetric contention issue, (ii) computing and comparing waiting time of different threads to identify load imbalance issue, and (iii) checking individual as well as collective (based on callsites) information of locks (i.e., the number of acquisitions and number of times they are contended) to identify other performance issues. This integration is very important, and helps uncover more performance issues. The present techniques may find more performance issues than conventional techniques. For some of the problems, such as asymmetric contention, and load imbalance, the present techniques may automatically report root causes and present an optimal task assignment to solve load imbalance problems. For other problems, the present techniques may provide sufficient information, as well as informal guidelines, to diagnose those problems manually. The present techniques may also provide an additional optional tool (that programmers can use offline) to help the diagnosis process.

The present techniques may find many previously unknown performance issues in widely used applications. The present techniques may consider that it is hard to detect problems such as asymmetric contention and load imbalance by observing the behavior of a single synchronization. To solve this problem, the present techniques may integrate information based on callsites of lock acquisitions (and initializations), lock variables, and types of threads. This integration may also contribute to the detection of some unknown issues. The present techniques may provide two tools that help diagnose root causes of performance bugs. The first is a detection tool that can report susceptible callsites and synchronization variables with potential performance issues, and identify some root causes such as asymmetric contention and load imbalance. This tool may have low overhead, which may be achieved even without using the sampling mechanism. The low overhead makes the tool a good candidate for the deployment environment. When multiple root causes may lead to the same behavior and thus, cannot be diagnosed easily, the present techniques may also provide a heavyweight diagnosis tool that collects detailed accesses inside susceptible critical sections to ease the diagnosis process. Both of these tools are software-only tools that do not require any modification or recompilation of applications, and custom operating system or hardware support As shown in FIG. 2, synchronization related performance issues may be divided into five categories: improper primitives, improper granularity, over-synchronization, asymmetric contention, and load imbalance. The first four categories are related to various locks, whereas the last one is related to other synchronizations such as conditional variables and barriers. The term. "CS" is short for "Critical Section" and "acqs" is short for "acquisitions". As shown in FIG. 1, the same symptom may have multiple root causes. For example, high contention of locks may occur due to too many data items under the same lock, too-large critical sections, over-synchronization, or asymmetric lock contention. Without knowing the root cause, it is difficult for programmers to fix these bugs effectively. Further, different categories of problems may have different symptoms and thus, different solutions. The present techniques may provide solutions for identifying and fixing these performance issues. This may help users to identify and fix synchronization performance issues.

As shown in FIG. 1, synchronization related performance issues may be divided into five categories. For example, one category is Improper Primitives. Programmers may use a variety of synchronization primitives (e.g., atomic instructions, spin locks, try-locks, read/write locks, mutex locks etc.) to protect shared accesses. These primitives impose different runtime overhead, increasing from atomic instructions to mutex locks. The spin lock of PTHREAD library, for example, may incur 50% less overhead than the mutex lock when there is no contention. However, during high contention, the spin lock may waste CPU cycles unnecessarily. Different synchronization primitives may have different use cases. Atomic instructions are best suited to perform simple integer operations, such as read-modify-write, addition, subtraction, exchange etc., on shared variables. Spin locks may be effective for small critical sections that have very few instructions but cannot be finished using a single atomic instruction. Read/write locks may be useful for reading mostly critical sections. Try-locks may allow a program to pursue an alternative path when locks are not available. Finally, mutex locks may be used when the critical sections contain waiting operations, such as conditional wait, and have multiple shared accesses. Any deviation from the preferred use cases may result in performance issues.

In order to identify Improper Primitives, it is noted that Improper Primitives typically cause extensive try-lock failures or extensive lock acquisitions, but low to moderate contention. Extensive try-lock failures, where a try-lock fails immediately because the lock is held by another thread, indicate that a blocking method should be used that combines conditional variables with mutexes to avoid continuous trial. Extensive lock acquisitions may incur significant performance degradation even without high contention. The importance of Improper Primitives may be seen from, for example, the FACESIM application of PARSEC, where changing mutex locks to atomic instructions may boost performance significantly.

Significant performance degradation may occur when locks are not used with a proper granularity (Improper Granularity). For example:

1. If a lock protects too many data items, for example, an entire hash table, as in the MEMCACHED-II bug, the lock may introduce a lot of contention. Splitting a coarse-grained lock into multiple fine-grained locks may help to improve performance.

2. If a lock protects a large critical section with many instructions, it may cause high contention and thus, a significant slowdown. CANNEAL of PARSEC, for example, has a critical section that includes a random number generator. Only a few instructions inside the critical section access the shared data. Although the number of acquisitions is only 15, performance is boosted when the random generator is moved outside the critical section.

3. If a critical section has very few instructions, then the overhead of lock acquisitions and releases may exceed the overhead of actual computations inside. In that case, the program may suffer from performance degradation. One possible solution is to merge multiple locks into a single coarse-grained one.

In order to identify Improper Granularity, it is noted that locks in the first two cases may incur significant contention. However, without knowing the memory accesses inside the critical section, it may be hard to identify this type of problems manually. Therefore, the present techniques may provide an additional diagnosis tool that tracks all memory accesses protected by a specific lock. Programmers may use the tool offline after some potential problems have been identified by embodiments of the detection tool. With the collected information, the first two cases may be differentiated. However, it may be more difficult to identify the third case.

Over-synchronization indicates a situation where a synchronization becomes unnecessary because the computations do not require any protection or they are already protected by other synchronizations. For example:

1. A lock is unnecessary if a critical section only accesses the local data, but not the shared data.
2. A lock is unnecessary if the protected computations are already atomic.
3. A lock is unnecessary if another lock already protects the computations. Some programs have such a problem, which utilizes the RANDOM( ) routine to determine the spin waiting time inside a mutex. Unfortunately, this routine has an internal lock that unnecessarily serializes every thread invoking this RANDOM( ) routine. The problem may be fixed by using a different random number generator that does not have any internal lock for the fast mutex.

Over-synchronization problems may be identified because they may cause a significant slow down when there are extensive lock acquisitions. This situation is similar to the first two categories of the improper granularity issue. Therefore, the present diagnosis tool may help analyze this situation. After a problem is identified, unnecessary locks may be removed to improve performance. However, removing locks may introduce correctness issues, and should be done cautiously.

Asymmetric contention occurs when some locks have significantly more contention than others that protect similar data. This category is derived from "asymmetric lock". For example, a hash table implementation may use bucket-wise locks. If the hash function fails to distribute the accesses uniformly, some buckets will be accessed more frequently than the others. Consequently, locks of those buckets will have more contention than the others. Changing the hash function may improve performance.

Asymmetric contention may be identified by collecting the number of lock acquisitions, how many times each lock is found to be unavailable, and their callsites. If multiple locks are protecting similar data (typically identified by the same callsites of lock acquisitions and releases), the present techniques may checks the lock contention rate and the number of acquisitions of these locks. When an asymmetric contention rate is found, for example, when the highest contention rate is 2 or more times the lowest one, the present techniques may report an asymmetric contention problem. Asymmetric contention problems may be reported automatically without any manual effort. Programmers, then, may fix the problem by evenly distributing the contention.

Regarding Load Imbalance, a thread can wait due to synchronizations such as mutex locks, conditional variables, barriers, semaphores, etc. A parent thread can also wait when it tries to join with the children threads. If a group of threads, such as threads with the same thread function, is found to have a waiting period much longer than that of other groups of threads, this may indicate a performance issue caused by load imbalance.

To identify load imbalance problems, the present techniques may collect the execution and waiting times of different threads by intercepting thread creations and synchronization functions. If the waiting time or computation time of different threads are substantially different, for example, outside a certain range, such as 20%, the program may be identified as having a load imbalance problem.

The present techniques may suggest an optimal task assignment for load imbalance problems after the identification. The computation time of every thread may be calculated by subtracting all waiting time (on conditional variables, mutex locks, and barriers) from their execution time. The total computation time of different groups of threads according to their thread functions may be computed, where threads executing the same function belong to the same group. In the end, the present techniques may suggest an optimal task distribution wherein each group of threads may be assigned an optimal number of threads that is proportional to the total workload of that type.

Figure 3:
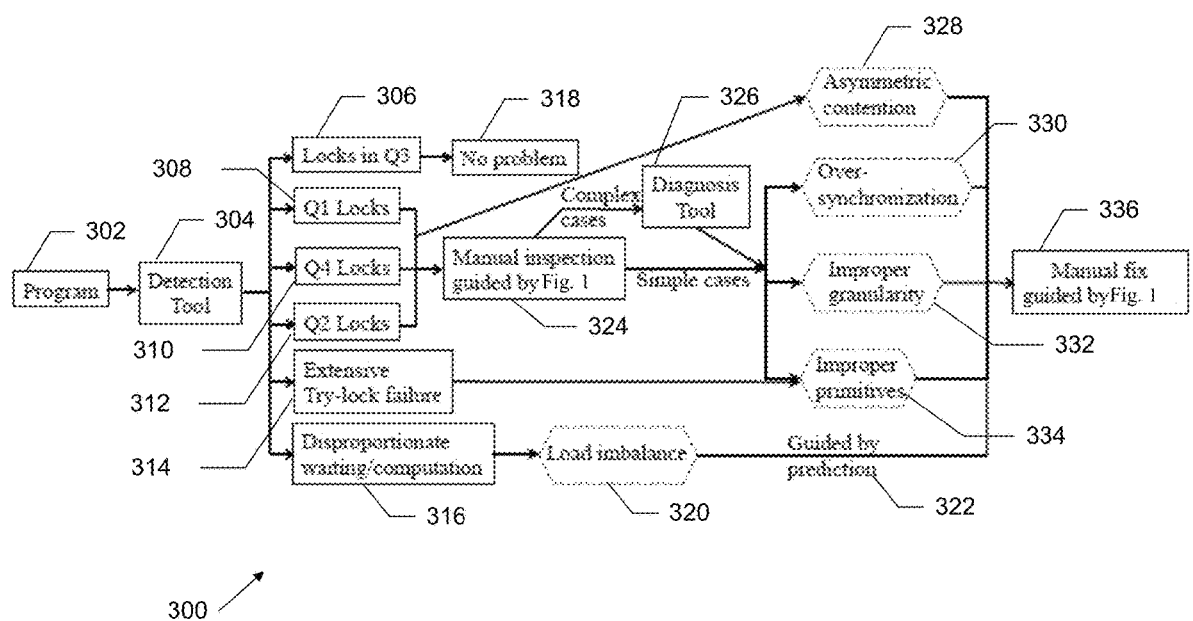
FIG. 3 illustrates an exemplary workflow of the present techniques.

An exemplary data flow and processing diagram of an embodiment of a workflow 300 according to the present techniques is shown in FIG. 3. Workflow 300 begins when a program 302 is analyzed by detection tool 304. Detection tool 304 may detect one or more issues 306-316. For mutex locks, the present techniques may report locks in three quadrants (Q1 locks 308, Q2 locks 312, and Q4 locks 310 of FIG. 1), while skipping Q3 locks 306 that do not cause performance issues. Detection tool 304 may detect try-lock failure rates 314 and whether there is a load imbalance problem 320 (based on disproportionate waiting/computation 316) among different types of threads. For the load imbalance problem 320, detection tool 304 may report not only report the root cause, but may also suggest an optimal configuration for different types of threads. This may be done without manual intervention. Programmers may use the suggested (predicted) distribution 322 to fix the load imbalance problem. If there is an asymmetric contention problem among similar locks, the tool may automatically identify the root cause. However, it is up to the programmer to develop a possible fix.

If detection tool 304 detects mutex locks in Q3 (of FIG. 1), the workflow proceeds to 318, in which it is determined that there is no problem, and no action need be taken. If detection tool 304 detects mutex locks in Q1 308, Q2 312, and Q4 310, if the reported code segments are simple, programmers can inspect them manually 324 to determine which category a problem belongs to, such as asymmetric contention 328, over-synchronization 330, improper granularity 332, and improper primitives 332, and take corresponding actions, such as consulting the table shown in FIG. 2 336. For complex situations, an additional diagnosis tool 326 may collect detailed information for critical sections reported by embodiments of the detection tool 304, in order to help programmers determine the particular type of performance issues, such as asymmetric contention 328, over-synchronization 330, improper granularity 332, and improper primitives 332. Again, the table shown in FIG. 2 may be used as an informal guideline during the categorization process. After determining the type of performance bugs, the table shown in FIG. 2 may guide programmers to develop a fix 336 for the bug. Some of the fixing strategies, for example fixing of over-synchronization problems, may require programmers to carefully consider correctness issues.

The present techniques may provide two tools to assist programmers in identifying bugs and fixing them: a detection tool and a diagnosis tool. By combining these two tools, the present techniques may not only answer "what" and "where" questions, but also "why" and "how to fix" (partially) questions for many synchronization related performance bugs.

Embodiments of the detection tool may use a lightweight profiling scheme to detect synchronizations with potential performance issues. It may also diagnose the root causes for asymmetric contention, extensive try-lock failures, and load imbalance problems without any manual intervention. Embodiments of the diagnosis tool may be based on Pin, a binary instrumentation tool. Embodiments of the diagnosis tool may monitor memory accesses inside specific critical sections to help identify root causes of problems with the same behavior. This heavyweight diagnosis tool may be employed when embodiments of the detection tool reports some potential problems that cannot be diagnosed easily. It utilizes prior knowledge of the particular problems that are reported by embodiments of the detection tool, and thus, instruments memory accesses inside the relevant critical sections only. Its overhead is typically substantially lower than the conventional techniques that instrument all memory accesses.

Figure 4:
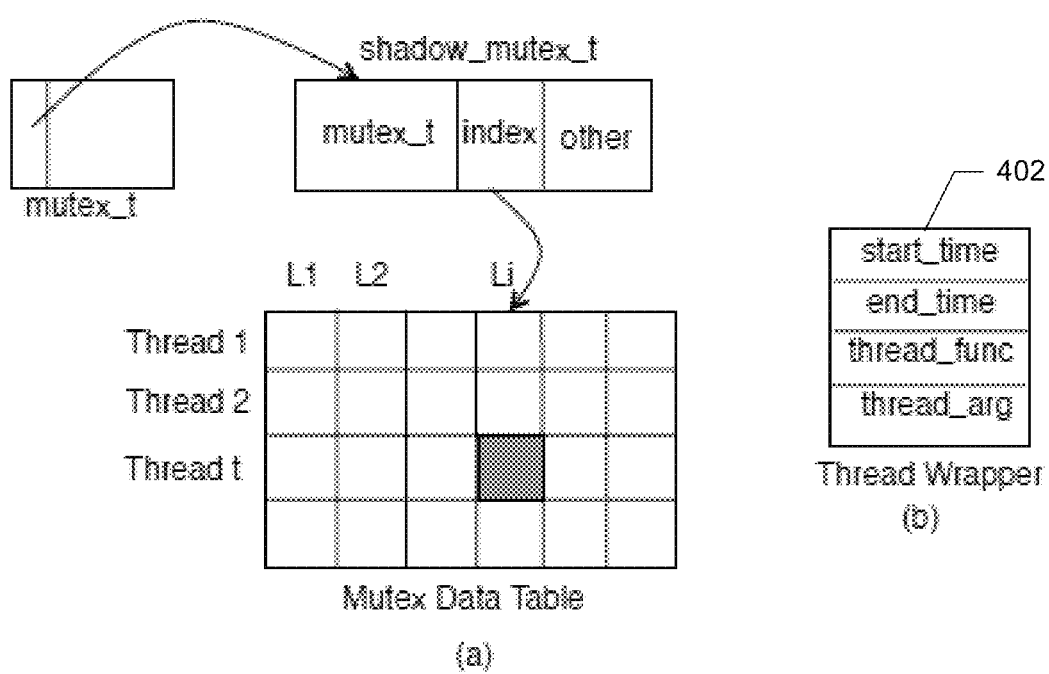
FIG. 4 illustrates an example of data structures that may be used by embodiments of the present techniques.
Figure 12:
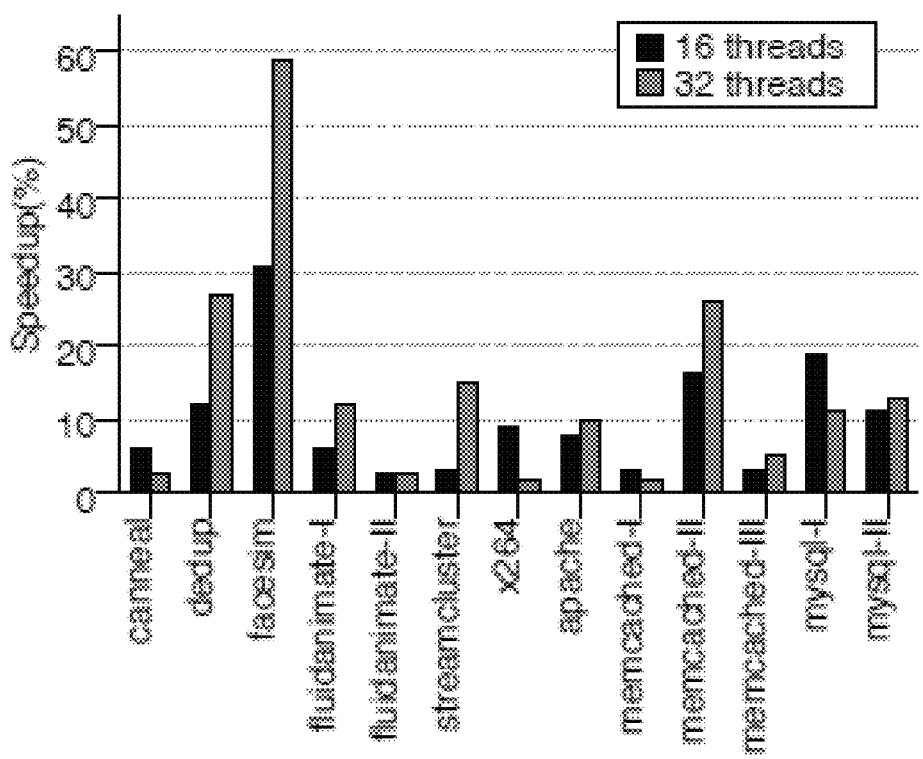
FIG. 12 illustrates an example of scalability of fixes to reduce synchronization performance issues.

The present techniques may provide the capability to collect data efficiently and analyze the data effectively. To collect the data, the present techniques may intercept PTHREAD's different types of explicit synchronization primitives, such as mutex locks, try-locks, conditional variables, barriers, and thread creation and exit functions, where the actual implementation is borrowed from the PTHREAD library. The present techniques may intercept PTHREAD create function calls and pass a custom function to the actual PTHREAD create function. This custom function may call the actual start routine function, and may collect timestamps of thread starting and exiting using RDTSC timer. The timestamps are saved into a thread wrapper 402 as shown at (b) in FIG. 4.

The present techniques may utilize the following mechanisms to achieve low overhead:

Indirection and per-thread data: In a higher overhead implementation to collect data for mutex locks, the actual profiling data for each mutex lock may be stored in a global hash table. Upon every mutex invocation, a lookup to the hash table may be performed to find the pointer to the actual data, and then the pointer may be updated correspondingly. However, this approach introduces significant overhead due to the hash table lookup (and possible lock protection) on every synchronization operation, and the possible cache coherence messages to update the shared data (true/false sharing effect). This is especially problematic when there is a significant number of acquisitions.

Instead, embodiments of the present techniques may use a level of indirection to avoid the lookup overhead, and a per-thread data structure to avoid the cache coherence traffic. An example of such a data structure is shown at (a) in FIG. 4. For every mutex, the present techniques may allocate a shadow MUTEX_T object and may use the first word of the original MUTEX_T object as a pointer to this shadow object. The shadow mutex structure may contain a real MUTEX_T object, an index for this mutex object, and some other data. The index may be initialized during the initialization of the mutex, or during the first lock acquisition if the mutex is not explicitly initialized. This index may be used to find an entry in the global Mutex Data Table, where each thread has a thread-wise entry. When a thread operates on a mutex lock, say Li, the present techniques may obtain the shadow MUTEX_T object by checking the first word of the original MUTEX_T object, and then may find its corresponding thread-wise entry using the index value. After that, the lock related data may be stored in its thread-wise entry, without generating any cache coherence message. Furthermore, the present techniques may prevent the false sharing effect by carefully keeping read-mostly data in shadow MUTEX_T object and padding them properly, while the actual profiling data (that keeps changing) is stored in thread-wise entries. The thread-wise data may be collected and integrated in the reporting phase.

Fast collection of callsites: embodiments of the present techniques may collect callsite information of every synchronization operation to provide exact source code location of performance bugs. It is important to minimize the overhead of collecting callsites, especially when there is a large number of synchronization operations. The present techniques may make three design choices to reduce the overhead. First, embodiments of the present techniques may avoid the use of the backtrace API of GLIBC, which is extremely slow due to its heavyweight instruction analysis. Instead of using backtrace, the present techniques may analyze frame pointers to obtain call stacks efficiently. However, this may impose a limitation that callsite information cannot be collected for programs without frame pointers. Second, embodiments of the present techniques may collect call stacks up to a predetermined depth, such as five. The depth may be limited because deeper stacks may introduce more overhead without any significant benefit. Third, embodiments of the present techniques may avoid collecting already-existing callsites. Obtaining the callsite of a synchronization and comparing it against all existing callsites one by one (to determine whether this is a new one) may incur substantial overhead. Alternatively, embodiments of the present techniques may utilize the combination of the lock address and the offset between the stack pointer (rsp register) and the top of the current thread's stack to identify the call stack. When different threads invoke a synchronization operation at the same statement, the combination of the lock address and stack offset are likely to be the same. If a combination is the same as that of one of the existing callsites, callsite information may not be collected. This method may significantly reduce the overhead of callsite collection and comparison.

Other mechanisms: To further reduce the runtime overhead, embodiments of the present techniques may avoid any overhead due to memory allocation by preallocating the Mutex Data Table and a pool of shadow mutex objects. This may be done during the program initialization phase. Embodiments of the present techniques may assume a predefined but adjustable maximum number of threads and mutex objects for this purpose. The data collection code may be placed outside a critical section as much as possible to avoid expanding the critical section. This avoids unnecessary serialization of threads. Because of these design choices, embodiments of the present techniques may impose very low runtime overhead (2.3%, on average). Even for an application such as FLUIDANIMATE that acquires 40K locks per millisecond, embodiments of the present techniques may impose only 19% runtime overhead. Due to its low overhead, embodiments of the detection tool may be used in production runs.

Analyzing and Reporting Problems: embodiments of the present techniques may report problems when a program is about to exit or it receives a special signal like SIGUSER2. Two steps may be performed to generate a report. First, all thread-wise data of a particular synchronization may be combined together to check the number of lock acquisitions, lock contentions, and try-lock failures. Potential problems may be reported if any synchronization variable shows the behaviors described above. Second, information of different synchronization variables and threads may be integrated together in order to discover more potential problems. For example: (1) the behavior of locks with the same callsites may be compared with each other: if some locks have significantly more contention than others, then there may be a problem of asymmetric contention. (2) Even if one particular lock is not acquired many times, the total number of acquisitions of locks with the same callsite can be significant and thus, cause a severe performance issue. (3) Information of different threads may be integrated together to identify load imbalance problems. When one type of threads (with the same thread function) have "disproportionate waiting time", it may be considered to be a strong indicator for the load imbalance issue. The integration of information may help find more potential problems.

Diagnosis Tool: the same behavior, for example, lock contention, may be caused by different root causes, such as asymmetric contention, improper granularity, or over-synchronization. Therefore, embodiments of the present techniques may provide a heavyweight diagnosis tool to help identify root causes of such problems. This heavyweight diagnosis tool is optional and not meant for production runs. When some potential problems are detected but they are hard to be diagnosed manually, this diagnosis tool may provide further information (e.g., memory accesses inside critical sections) that include: how many instructions are executed on average inside each critical section; how many of these instructions access shared and non-shared locations; how many different memory locations are accessed inside a critical section; and how many instructions are read or write accesses. Embodiments of the diagnosis tool may be based on a binary instrumentation framework, such as Pin. Embodiments of the diagnosis tool may take a list of problematic locks (along with their callsites) as the input, which is generated from embodiments of the detection tool's report. When a lock function is encountered, embodiments of the diagnosis tool may check whether the lock is one of the problematic ones. If so, embodiments of the diagnosis tool may keep counting the instructions and monitoring the memory accesses inside. Embodiments of the diagnosis tool may also maintain a hash table to keep track of memory locations inside critical sections. The hash table may help to determine how many data items have been accessed inside a critical section. This information may help identify the situation where a lock protects too many data items, or too many instructions that are accessing non-shared data inside a critical section. Like embodiments of the detection tool, embodiments of the diagnosis tool may maintain thread-wise and lock-wise counters for each synchronization. It may also integrate information together in the end.

Usage Examples: embodiments of the present techniques may provide two tools that help identify the root causes of problems. For example, an exemplary report generated by embodiments of the detection tool for application CANNEAL of PARSEC is shown in FIG. 5. For example, for locks, embodiments of the detection tool may report the locks that exhibits similar characteristics as the three performance bug causing quadrants as shown in FIG. 1. For each lock, embodiments of the detection tool may report source code information. For CANNEAL, embodiments of the detection tool may only report one lock with high contention rate and low acquisition frequency in the rng.h file. The corresponding code is shown in FIG. 7. The root cause of this synchronization performance bug is not very trivial. Therefore, embodiments of the diagnosis tool may be used to determine the cause. Embodiments of the diagnosis tool may take the reported locks from a specified file in the same directory, mostly call stacks of corresponding locks, as the input. An example of a report from embodiments of the diagnosis tool is shown in FIG. 5. For the CANNEAL application, embodiments of the diagnosis tool may report that only fewer than 1% of the instructions access the shared memory. Further consultation of the source code shown in FIG. 7 may indicate that seed is the only shared access inside the critical sections. However, CANNEAL currently puts the whole random generator inside the critical section. Moving the random generator out of the critical section may improve the performance of this application by, for example, 4%.

Effectiveness: embodiments of the present techniques may detect synchronization related performance bugs. Examples of the results are shown in FIG. 8. In this example, seven unknown bugs (with a mark in last column) in addition to nine known bugs were found. For MySQL and MEMCACHED, the throughput is used as the performance metric. If an application has multiple bugs, a number may be appended as the bug id. "Acq. Frequency" column shows the number of acquisitions per second. The performance results are based on the average runtime of 10 executions. In this example, embodiments of the diagnosis tool detected nine performance bugs in PARSEC and six performance bugs in real world applications. Among the 15 performance bugs, seven were previously undiscovered, including three in large real applications such as MySQL and MEMCACHED.

False Positives: false positives were evaluated, using the threshold for contention rate and acquisition frequency of 10% and 1000 per second respectively. Embodiments of the present techniques may have no false positives for 12 programs (see FIG. 8) of PARSEC and MEMCACHED application. Analysis of other programs shows a low rate of false positives.

False Negatives: while is difficult to assess whether embodiments of the present techniques produce false negatives, evaluations indicate a low rate of false negatives.

Extensive Acquisitions and High Contention: Asymmetric Contention: DEDUP is a compression program with data de-duplication algorithm. It has extensive lock acquisitions (23531 per second) and a high contention rate (13.6%) in an array of locks (encoder.c:1051). These locks protect different buckets of a hash table. Embodiments of the present techniques may detect these locks with asymmetric contention problems. These locks (with the same callsite) may have different numbers of lock acquisitions, ranging from 3 to 8586; the one with the most acquisitions has a contention rate of 13.6%, while others have less than 1% contention rate. Embodiments of the present techniques may automatically identify this bug, without resorting to manual expertise.

Improper Granularity: MEMCACHED-1.4.4 has a known performance bug caused by improper granularity of locks. It uses a single cache lock to protect an entire hash table. The application MEMSLAP was used to generate 10000 get and set requests to exercise MEMCACHED (with 16 threads), In this example, 71405 lock acquisitions per second were detected and a high contention rate (45.8%). Embodiments of the diagnosis tool found that a single lock protects over 9 million different shared locations. This lock is too coarse-grained. Changing the global cache lock to an array of item locks as appeared in MEMCACHED-2.4.24 improves the throughput by 16.3%. This bug is shown as MEMCACHED-II in FIG. 8.

MySQL, a popular database server program, has a similar problem (MySQL-II in FIG. 8). When the input table data is not using the default character set of the server or latin1, MySQL calls get internal CHARSET( ) function. In this example, extensive lock acquisitions were detected (146299 per second) and a high contention rate (38.5%). Furthermore, embodiments of the diagnosis tool reported that a single mutex lock protects 512 different shared variables, with 16384 bytes in total. By replacing the lock with an array of locks with one lock per CHARSET, the throughput of MySQL is improved by 10.9%.

A new performance bug was reported (MySQL-I) in the end thr alarm function of MySQL. Extensive lock acquisitions were reported (723K per second) and a high contention rate (25.5%) for mutex LOCK alarm. The critical section has unnecessary conditional waits inside, possibly caused by code evolution. Programmers might have restructured the code logic, but forgot to remove these unnecessary waits. Removing the conditional wait improves performance of MySQL by 18.9%.

Extensive Acquisitions but Low Contention: These locks are in Q4 of FIG. 1. As shown in FIG. 8, 5 out of 15 performance bugs fall into this category.

Improper Primitives: FACESIM is a PARSEC application that simulates the motion of human faces. Embodiments of the present techniques may detect that one type of locks (ones with the same callsite) has 15288 acquisitions per second but the contention rate is very low (4.6%). Mutex locks and conditional variables were replaced with atomic instructions, and that improved the performance by 31%. A code snippet of fix is shown in FIG. 9.

FLUIDANIMATE simulates fluid dynamics for the animation purpose in PARSEC. This application uses a two-dimensional array of mutex locks to synchronize concurrent updates of grid data. There are 92K distinct locks, with around 40M acquisitions per second. However, the contention rate is almost 0%. In this application, each individual lock has only few thousand acquisitions, but one callsite has a combined acquisition rate of 400M. This bug may be detected (FLUIDANIMATE-I in FIG. 8) by integrating the data from the same callsites. Manual inspection of the code shows that each critical section has fewer than 2 instructions. Therefore, these locks were replaced with PTHREAD spin lock, for example, shown in FIG. 10, and (in some cases) atomic instructions. The fix improved the performance by 11.9%.

x264 is an application of PARSEC for video encoding. Extensive lock acquisitions were detected (15857 times per second), but with almost 0% contention rate. Embodiments of the diagnosis tool further showed that one critical section has fewer than 3 instructions. By replacing the existing code with atomic instructions (less than 5 lines of code change), 8.5% performance improvement is achieved.

A new performance bug in was detected in Apache in which the g timer skiplist mtx mutex in event.c- :1592 has a high acquisition frequency (49607 per second) with almost 0% contention rate. Replacing PTHREADmutex lock with PTHREAD spinlock resulted a 7.8% performance improvement.

The MEMCACHED-I bug in FIG. 8 2 also has extensive lock acquisitions but almost no contention. Embodiments of the diagnosis tool identified that there are only (on average) 2.7 instructions for every critical section. This may be fixed by replacing PTHREAD mutex lock with PTHREAD spinlock. By doing so, the performance is improved by 3.7%.

Over-Synchronization: The MEMCACHED-III bug in FIG. 8 has 65445 lock acquisitions per second and contention rate is almost 0%. This is an over-synchronization bug. In this application, item remove function uses item lock to synchronize the removal operations. However, removal operations eventually execute an atomic instruction to decrement a reference count. By eliminating this unnecessary lock, performance of this program was improved by 3.0%.

Few Lock Acquisitions but High Contention: usually, it is assumed that few lock acquisitions will not cause any performance problem. But this is not always true, especially when contention causes threads to wait for a long time.

Improper Granularity: Such a problem was found in CANNEAL, which simulates a cache-aware simulated annealing algorithm to optimize the routing cost of a chip design. CANNEAL acquires seed lock only 15 times, one for each thread, but lock contention rate is 86%. Also, the total waiting time for this lock is around 0.5 seconds. The root cause of this bug is not very obvious. Embodiments of the diagnosis tool further discovered that there are 46979 instructions accessing memory inside the critical sections, but only 28 instructions access the shared variable. By moving the random number generator out of the critical section, the fix as shown in FIG. 11 reduces the total execution time by around 2 seconds (from 51 seconds), and improves the performance of CANNEAL around 4%. It is not clear why reorganizing a critical section with 0.5 second waiting time can reduce the total execution time by around 2 seconds.

Extensive Try-lock Failures As described above, too many try-lock failures indicate that a synchronization method combining mutex locks with conditional variables can be useful to improve the performance.

Improper Primitives: Both FLUIDANIMATE and STREAMCLUSTER have this type of problem. For FLUIDANIMATE-II bug of FIG. 8, A high try-lock failure rate (76.6%) was detected, as was 16204 lock acquisitions per second, located at line 153 of PTHREADs.cpp. PARSEC implements a custom barrier by doing a busy wait with a try-lock. By replacing the try-lock based custom barrier implementation with PTHREAD's barrier, the performance of this program improved around 2.5%. STREAMCLUSTER uses the same custom barrier as that of FLUIDANIMATE. No performance improvement was observed by replacing the custom barrier with PTHREAD's barrier. However, by modifying the custom barrier implementation with atomic instructions, performance improved by 3%.

Disproportionate Waiting/Computation: embodiments of the present techniques detected known load imbalance problems in two applications of PARSEC-DEDUP and ferret. For the load imbalance problems, embodiments of the present techniques also suggested an optimal task assignment to fix the problem, which is not possible in existing tools. ferret searches images for similarity. ferret has four different stages that perform image segmentation, feature extraction, indexing, and ranking separately. By default, ferret creates the same number of threads for different stages. Embodiments of the present techniques detected that different types of threads have a completely different waiting time, such as 4754 ms, 5666 ms, 4831 ms, and 34 ms respectively. This clearly indicates that some stages may not have enough threads and others may have too many threads. The best assignment was predicted to be (1-0.2-2.5-12.2). Thus either (1-1-3-11) or (1-1-2-12) can be an optimal distribution. With experimentation with all reasonable assignments, the best assignment was found to be (1-1-3-11). Using the suggested task assignment (1-1-3-11) improves the performance of ferret by 42%.

DEDUP creates the same number of threads for fine-grained fragmentation, hash computation, and compression stage. The average waiting times of different groups of threads were detected to be 1175 ms, 0 ms, and 1750 ms respectively (shown as DEDUP-II in FIG. 8). The average execution time of these groups of threads are 3723 ms, 1884 ms, and 12836 ms. Thus, the big difference between different groups of threads clearly indicates a load imbalance problem. The best assignment was predicted to be (2.4-1.2-8.4). Thus, the assignment (2-1-9) or (3-1-8) or (2-2-8) could be the best assignment. The actual best assignment was found to be (1-1-10), with 28% performance improvement. Embodiments of the present techniques predicted the one just close to the best one, with 25% performance improvement.

Figure 13:
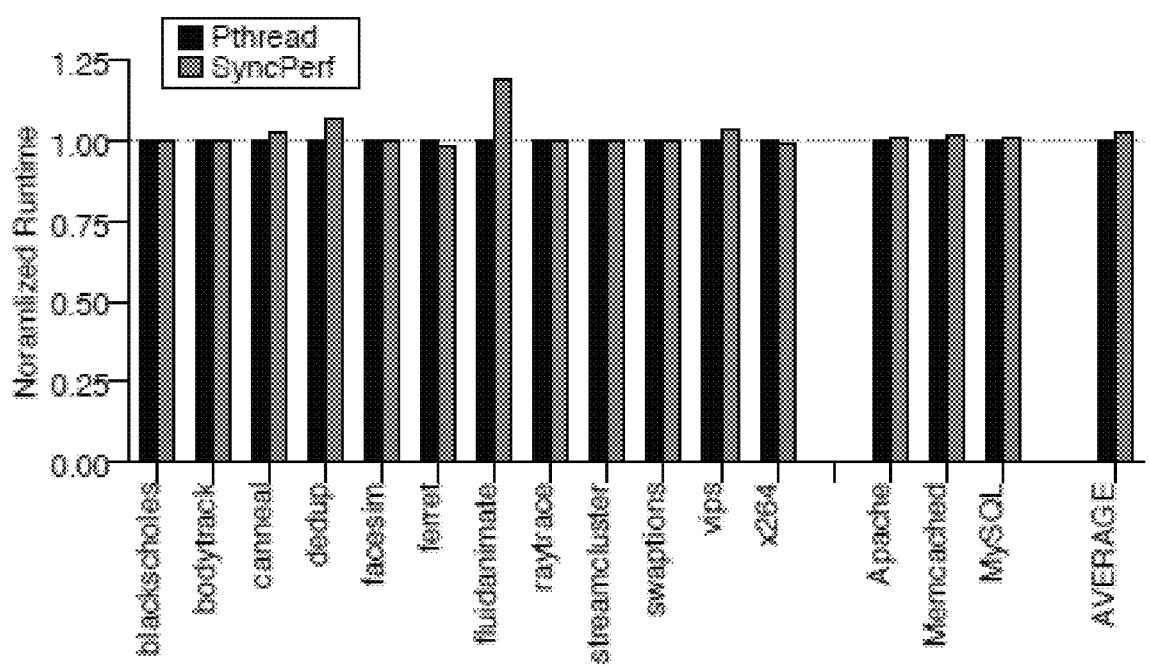
FIG. 13 illustrates an example of normalized performance of embodiments of the present techniques.

Scalability of Fixes: Changing mutex locks to atomic sections may compromise the scalability of applications. To confirm whether the fixes are scalable or not, experiments were run with 16 threads and 32 threads on the machine with 16 cores. FIG. 13 shows results for every bug fix, except two programs with load imbalance problems. Overall, the fixing strategies boost the performance for every bug, even with twice as many threads. However, it is worth noting that these fixes, especially the one that replaces mutex locks with spin locks, may experience some scalability problem when the number of threads is much larger than the number of cores, such as more than 4 times. This is due to the fact that spinning may waste CPU cycles unnecessarily.

Performance Overhead: Detection Tool: examples of the performance overhead of embodiments of embodiments of the detection tool are shown in FIG. 13, with 16 threads in total. In the example of FIG. 13, each program was run 10 times and showed the average runtime in this figure. The execution times of these applications are normalized to that of using the PTHREAD library. Higher bars indicate larger performance overhead. The deviation bars are not recognizable in the figure since the deviation of results is less than 0.1%. On average, using embodiments of the present techniques introduces only 2.3% performance overhead. Except for two applications, FLUIDANIMATE and DEDUP, embodiments of embodiments of the detection tool introduce less than 6% performance overhead. Embodiments of the present techniques may introduce a slightly higher performance overhead when the number of lock acquisitions per second is large and/or memory consumption is high. As shown in FIG. 13, FLUIDANIMATE is an extreme case with 92K distinct locks and more than 1,700M lock acquisitions in 40 seconds. Embodiments of the present techniques may only add 19% overhead even for this application. DEDUP introduces around 6.7% overhead because it has 62K lock acquisitions per second.

Diagnosis Tool: Not all applications require embodiments of the diagnosis tool. Sometimes it is fairly easy for programmers to recognize memory accesses inside critical sections. Programmers may use embodiments of the diagnosis tool to obtain detailed information about memory accesses inside critical sections, when the critical sections are hard to be analyzed manually. In experiments, embodiments of the diagnosis tool were run only for four applications—FLUIDANIMATE, CANNEAL, MEMCACHED, and MySQL. Among them, the highest overhead was 11.7× for FLUIDANIMATE. Other applications such as MySQL, MEMCACHED, and CANNEAL introduced 9.9×, 8.7× and 3.5× overhead respectively. Excessive performance overhead may be avoided by only checking accesses of the specified critical sections.

Memory Overhead: the physical memory overhead of embodiments of the detection tool is listed in the last column of the table shown in FIG. 14. The maximum physical memory consumption is used for the comparison, which is obtained through /proc/self/smaps file. This file was periodically collected and the sum of the proportional set size (PSS) was computed. FIG. 14 shows that the memory overhead of embodiments of the present techniques may vary from 1% to 215%. Embodiments of the present techniques may impose some startup overhead for all applications, thus applications with small memory footprint tend to have a larger percentage of memory overhead, such as swaptions. An application with more distinct locks may also have more memory overhead. However, embodiments of the present techniques may only require 36% more memory than that of PTHREAD for all applications.

Figure 15:
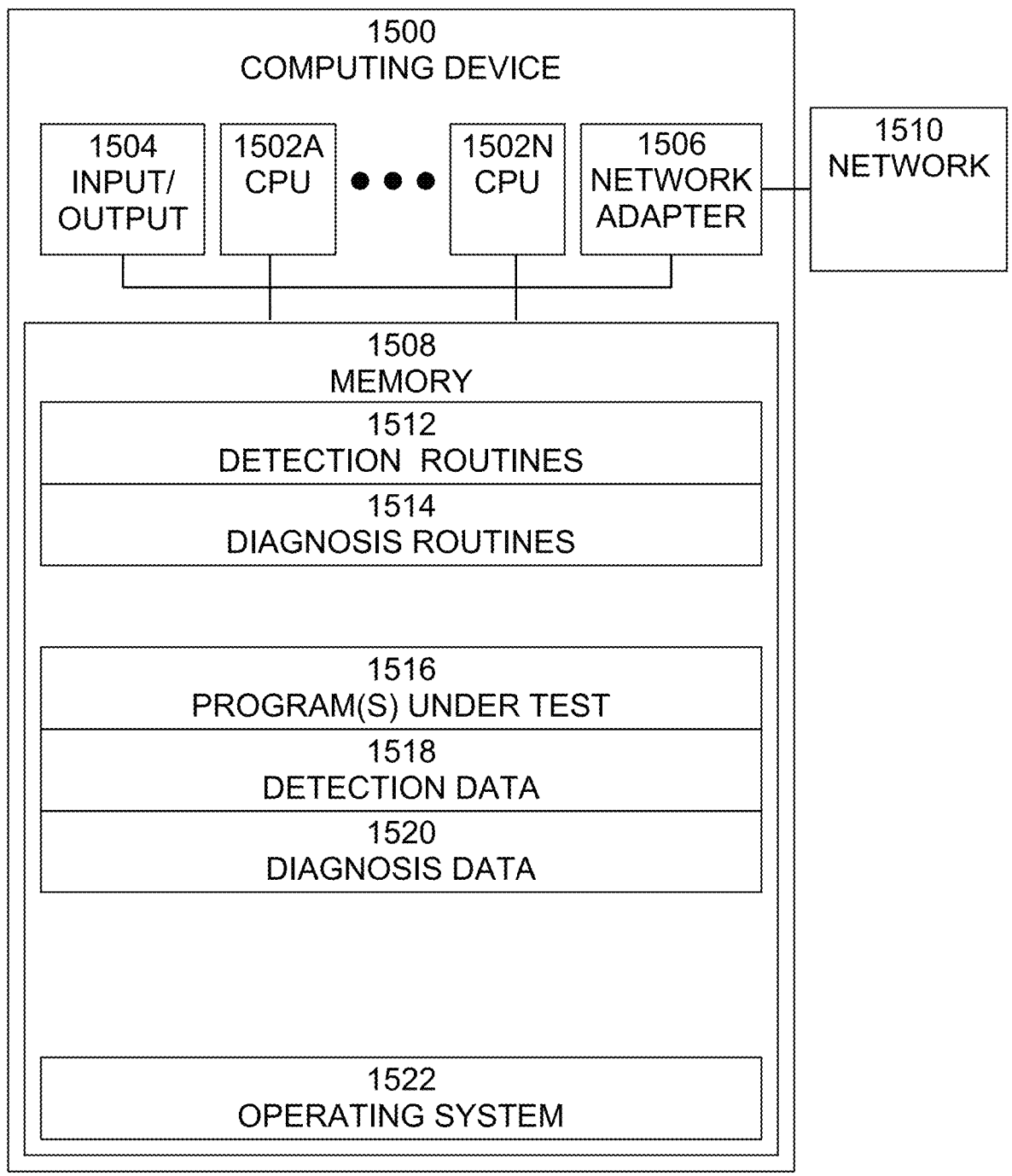
FIG. 15 illustrates an example of a computer system in which embodiments of the present techniques may be implemented.

An exemplary block diagram of a computer system 1500, in which entities and processes involved in the embodiments described herein may be implemented, is shown in FIG. 15. Computer system 1500 may typically be implemented using one or more programmed general-purpose computer systems, such as embedded processors, systems on a chip, personal computers, workstations, server systems, and minicomputers or mainframe computers, or in distributed, networked computing environments. Computer system 1500 may include one or more processors (CPUs) 1502A-1502N, input/output circuitry 1504, network adapter 1506, and memory 1508. CPUs 1502A-1502N execute program instructions in order to carry out the functions of the present communications systems and methods. Typically, CPUs 1502A-1502N are one or more microprocessors, such as an INTEL CORE® processor.

FIG. 15 illustrates an embodiment in which computer system 1500 is implemented as a single multi-processor computer system, in which multiple processors 1502A-1502N share system resources, such as memory 1508, input/output circuitry 1504, and network adapter 1506. However, the present communications systems and methods also include embodiments in which computer system 1500 is implemented as a plurality of networked computer systems, which may be single-processor computer systems, multi-processor computer systems, or a mix thereof.

Input/output circuitry 1504 provides the capability to input data to, or output data from, computer system 1500. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1506 interfaces device 1500 with a network 1510. Network 1510 may be any public or proprietary LAN or WAN, including, but not limited to the Internet.

Memory 1508 stores program instructions that are executed by, and data that are used and processed by, CPU 1502 to perform the functions of computer system 1500. Memory 1508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1508 may vary depending upon the function that computer system 1500 is programmed to perform. In the example shown in FIG. 15, exemplary memory contents are shown representing routines and data for embodiments of the processes described above. However, one of skill in the art would recognize that these routines, along with the memory contents related to those routines, may not be included on one system or device, but rather distributed among a plurality of systems or devices, based on well-known engineering considerations. The present communications systems and methods may include any and all such arrangements.

In the example shown in FIG. 15, memory 1508 may include detection routines 1512, diagnosis routines 1514, one or more programs under test 1516, detection data 1518, diagnosis data 1520, and operating system 1522. Detection routines 1512 may include software routines to perform detection of performance issues as described above. Diagnosis routines 1514 may include software routines to perform diagnosis of performance issues as described above. Program(s) under test 1516 may include software programs, packages, routines, etc. that are to be analyzed by detection routines 1512 and/or diagnosis routines 1514 as described above. Detection data 1518 may include data relating to detected performance issues that was generated by detection routines 1512 as described above. Diagnosis data 1520 may include data relating to diagnosed performance issues that was generated by diagnosis routines 1514 as described above. Operating system 1522 may provide overall system functionalities.

As shown in FIG. 15, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it.

Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. Thus, it is impossible for any program to damage the execution of any of the other programs running on the system. However, the programs have no way to exchange any information except through the operating system (or by reading files stored on the file system).

Multi-process computing is similar to multi-tasking computing, as the terms task and process are often used interchangeably, although some operating systems make a distinction between the two. The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or that carry out combinations of special purpose hardware and computer instructions. Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

From the above description, it can be seen that the present invention provides a system, computer program product, and method for the efficient execution of the described techniques. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the foregoing written description of the invention enables one of ordinary skill to make and use what is considered presently to be the best mode thereof, those of ordinary skill will understand and appreciate the existence of alternatives, adaptations, variations, combinations, and equivalents of the specific embodiment, method, and examples herein. Those skilled in the art will appreciate that the within disclosures are exemplary only and that various modifications may be made within the scope of the present invention. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. The invention should therefore not be limited by the described embodiment, method, and examples, but by all embodiments and methods within the scope and spirit of the invention. Accordingly, the present invention is not limited to the specific embodiments as illustrated herein, but is only limited by the following claims.

What is claimed is:

1. A method implemented in a computer system comprising a processor, memory accessible by the processor, and program instructions stored in the memory and executable by the processor to perform a method comprising:
   detecting occurrence of synchronization performance problems in software code;
   when at least some detected synchronization performance problems occur when a contention rate for software locks is lower than 5%, determining a cause of the synchronization performance problems; and
   modifying the software code to remedy the determined cause of the synchronization performance problems so as to improve synchronization performance of the software code.

2. The method of claim 1, wherein the cause of the synchronization performance problems comprises at least one of: improper primitives, improper granularity, over-synchronization, asymmetric contention, and load imbalance.

3. The method of claim 2, wherein:
   when the cause of the synchronization performance problems comprises improper primitives, modifications to the software code include modifying atomic instructions and spin locks;

when the cause of the synchronization performance problems comprises improper granularity, modifications to the software code include modifying fineness of locks and reducing a critical section;

when the cause of the synchronization performance problems comprises over-synchronization, modifications to the software code include removing an unnecessary lock and removing a common lock;

when the cause of the synchronization performance problems comprises asymmetric contention, modifications to the software code include distributing contentions;

when the cause of the synchronization performance problems comprises load imbalance, modifications to the software code include redistributing tasks among threads.

4. The method of claim 1, further comprising:
when at least some detected synchronization performance problems occur when a contention rate for software locks is higher than or equal to 5% and a frequency of lock acquisitions is lower than 1000 Hz, determining a cause of the synchronization performance problems; and
modifying the software code to remedy the cause of the synchronization performance problems so as to improve synchronization performance of the software code.

5. The method of claim 1, wherein detecting occurrence of synchronization performance problems in software code comprises using a detection tool to report susceptible callsites and synchronization variables.

6. The method of claim 5, further comprising:
when at least some detected synchronization performance problems occur
when a contention rate for software locks is higher than or equal to 5% and a frequency of lock acquisitions is lower than 1000 Hz, or
when a contention rate for software locks is higher than or equal to 5% and a frequency of lock acquisitions is higher than or equal to 1000 Hz, or
when a contention rate for software locks is lower than 5% and a frequency of lock acquisitions is higher than or equal to 1000 Hz,
determining a cause of the synchronization performance problems comprises using a diagnosis tool that collects detailed accesses inside susceptible critical sections.

7. The method of claim 1, further comprising:
monitoring execution of the software code and collecting information about explicit synchronization primitives.

8. The method of claim 7, wherein the collecting information comprises:
for a lock, how many times the lock is acquired, how many times the lock is found to be contended, and how long a thread waits for the lock,
for a try-lock, how many times the try-lock is called and how many times the try-lock fails because of contention, and
for load imbalance, how long different threads execute and how long they are waiting for synchronizations.

9. The method of claim 1, further comprising:
collecting callsites for each synchronization operation.

10. The method of claim 9, wherein the detection comprises at least one of:
checking behavior of all locks with similar callsites to identify asymmetric contention;
computing and comparing waiting time of different threads to identify load imbalance; and
checking individual as well as collective information of locks, using callsites, to identify other synchronization performance problems.

11. A system comprising a processor, memory accessible by the processor, and program instructions stored in the memory and executable by the processor to perform a method comprising:
detecting occurrence of synchronization performance problems in software code;
when at least some detected synchronization performance problems occur when a contention rate for software locks is lower than 5%, determining a cause of the synchronization performance problems; and
modifying the software code to remedy the determined cause of the synchronization performance problems so as to improve synchronization performance of the software code.

12. The system of claim 11, wherein the cause of the synchronization performance problems comprises at least one of: improper primitives, improper granularity, over-synchronization, asymmetric contention, and load imbalance.

13. The system of claim 12, wherein:
when the cause of the synchronization performance problems comprises improper primitives, modifications to the software code include modifying atomic instructions and spin locks;
when the cause of the synchronization performance problems comprises improper granularity, modifications to the software code include modifying fineness of locks and reducing a critical section;
when the cause of the synchronization performance problems comprises over-synchronization, modifications to the software code include removing an unnecessary lock and removing a common lock;
when the cause of the synchronization performance problems comprises asymmetric contention, modifications to the software code include distributing contentions;
when the cause of the synchronization performance problems comprises load imbalance, modifications to the software code include redistributing tasks among threads.

14. The system of claim 11, further comprising:
when at least some detected synchronization performance problems occur when a contention rate for software locks is higher than or equal to 5% and a frequency of lock acquisitions is lower than 1000 Hz, determining a cause of the synchronization performance problems; and
modifying the software code to remedy the cause of the synchronization performance problems so as to improve synchronization performance of the software code.

15. The system of claim 11, wherein detecting occurrence of synchronization performance problems in software code comprises using a detection tool to report susceptible callsites and synchronization variables.

16. The system of claim 15, further comprising:
when at least some detected synchronization performance problems occur
when a contention rate for software locks is higher than or equal to 5% and a frequency of lock acquisitions is lower than 1000 Hz, or
when a contention rate for software locks is higher than or equal to 5% and a frequency of lock acquisitions is higher than or equal to 1000 Hz, or when a contention rate for software locks is lower than 5% and a frequency of lock acquisitions is higher than or equal to 1000 Hz, determining a cause of the synchronization performance problems comprises using a diagnosis tool that collects detailed accesses inside susceptible critical sections.

17. The system of claim 11, further comprising:

monitoring execution of the software code and collecting information about explicit synchronization primitives.

18. The system of claim 17, wherein the collecting information comprises:

for a lock, how many times the lock is acquired, how many times the lock is found to be contended, and how long a thread waits for the lock, for a try-lock, how many times the try-lock is called and how many times the try-lock fails because of contention, and for load imbalance, how long different threads execute and how long they are waiting for synchronizations.

19. The system of claim 11, further comprising:

collecting callsites for each synchronization operation.

20. The system of claim 19, wherein the detection comprises at least one of:

checking behavior of all locks with similar callsites to identify asymmetric contention;

computing and comparing waiting time of different threads to identify load imbalance; and checking individual as well as collective information of locks, using callsites, to identify other synchronization performance problems.

* * * * *